United States Patent

Green et al.

[11] Patent Number: 5,872,195
[45] Date of Patent: *Feb. 16, 1999

[54] CURABLE COATING COMPOSITIONS CONTAINING CARBAMATE ADDITIVE

[75] Inventors: Marvin L. Green, Brighton; John W. Rehfuss, West Bloomfield, both of Mich.

[73] Assignee: BASF Corporation, Southfield, Mich.

[ * ] Notice: The term of this patent shall not extend beyond the expiration date of Pat. No. 5,693,723.

[21] Appl. No.: 886,321

[22] Filed: Jul. 1, 1997

Related U.S. Application Data

[60] Provisional application No. 60/021,068 Jul. 1, 1991.
[51] Int. Cl.$^6$ .............................. C08G 8/28; C08G 59/14; C08L 63/00; C08L 67/04
[52] U.S. Cl. .......................... 525/481; 525/488; 525/510; 525/514; 525/528; 525/129; 525/144; 525/146; 525/163; 525/423.1
[58] Field of Search ..................................... 525/481, 488, 525/510, 514, 528; 528/129, 144, 146, 163; 428/423.1

[56] References Cited

U.S. PATENT DOCUMENTS 5,693,723   12/1997   Green ........................................ 525/481

*Primary Examiner*—Duc Truong
*Attorney, Agent, or Firm*—Anne Gerry Sabourin

[57] ABSTRACT

Curable coating compositions are described comprising (a) a polymer resin comprising active hydrogen-containing functional groups, (b) a curing agent having groups that are reactive with said functional groups on (a), and (c) a compound comprising at least one carbamate group that is the reaction product of:

(1) a hydroxyl group that is the result of a ring-opening reaction between an epoxy group and an organic acid group, and (2) cyanic acid or a compound comprising a carbamate group.

24 Claims, No Drawings

CURABLE COATING COMPOSITIONS CONTAINING CARBAMATE ADDITIVE

This application claims benefit of Provisional No. 60/021,068, filed Jul. 1, 1991.

FIELD OF THE INVENTION

This invention relates to coating compositions, especially compositions for high-gloss topcoats, and more especially the clearcoat of color-plus-clear composite coatings.

BACKGROUND OF THE INVENTION

Curable coating compositions such as thermoset coatings are widely used in the coatings art. They are often used for topcoats in the automotive and industrial coatings industry. Color-plus-clear composite coatings are particularly useful as topcoats where exceptional gloss, depth of color, distinctness of image, or special metallic effects are desired. The automotive industry has made extensive use of these coatings for automotive body panels. Color-plus-clear composite coatings, however, require an extremely high degree of clarity in the clearcoat to achieve the desired visual effect. High-gloss coatings also require a low degree of visual aberations at the surface of the coating in order to achieve the desired visual effect such as high distinctness of image (DOI).

As such, these coatings are especially susceptible to a phenomenon known as environmental etch. Environmental etch manifests itself as spots or marks on or in the finish of the coating that often cannot be rubbed out.

It is often difficult to predict the degree of resistance to environmental etch that a high gloss or color-plus-clear composite coating will exhibit. Many coating compositions known for their durability and/or weatherability when used in exterior paints, such as high-solids enamels, do not provide the desired level of resistance to environmental etch when used in high gloss coatings such as the clearcoat of a color-plus-clear composite coating.

Many compositions have been proposed for use as the clearcoat of a color-plus-clear composite coating, such as polyurethanes, acid-epoxy systems and the like. However, many prior art systems suffer from disadvantages such as coatability problems, compatibility problems with the pigmented basecoat, solubility problems. Moreover, very few one-pack coating compositions have been found that provide satisfactory resistance to environmental etch, especially in the demanding environment of automotive coatings.

There is also a continuing desire to reduce the volatile organic content (VOC) of coating compositions. This must be done without sacrificing the rheological properties of the coating composition required for trouble-free application of the composition while maintaining the desired level of appearance. In addition, it is desirable to provide coatings with a good combination of properties such as durability, hardness, flexibility, and resistance to scratching, marring, solvents, and acids.

Curable coating compositions utilizing carbamate-functional resins are described in U.S. Pat. No. 5,356,669. These coating compositions can provide significant etch advantages over other coating compositions, such as hydroxy-functional acrylic/melamine coating compositions. It may often be desirable, however, to provide still further improvements in the above-described coating properties.

SUMMARY OF THE INVENTION

According to the present invention, there is provided a curable coating composition comprising (a) a polymer resin comprising active hydrogen-containing functional groups, (b) a curing agent having groups that are reactive with said functional groups on (a), and (c) a compound comprising at least one carbamate group that is the reaction product of:
(1) a hydroxyl group that is the result of a ring-opening reaction between an epoxy group and an organic acid group, and
(2) cyanic acid or a carbamate group.

DESCRIPTION OF THE PREFERRED EMBODIMENTS

The composition according to the present invention comprises a polymer resin (a) having active hydrogen-containing. Such polymer resins include, for example, acrylic polymers, modified acrylic polymers, polyesters, polyepoxides, polycarbonates, polyurethanes, polyamides, polyimides, and polysiloxanes, all of which are well-known in the art. Preferably, the polymer is an acrylic, modified acrylic or polyester. More preferably, the polymer is an acrylic polymer. Active hydrogen-containing functional groups on polymer resins are well-known in the art. Such groups include, for example, hydroxyl groups, carbamate groups, urea groups, amino groups, thiol groups, hydrazide groups, and activated methylene groups.

In one preferred embodiment of the invention, the polymer is an acrylic. The acrylic polymer preferably has a molecular weight of 500 to 1,000,000, and more preferably of 1500 to 50,000. As used herein, "molecular weight" refers to number average molecular weight, which may be determined by the GPC method using a polystyrene standard. Such polymers are well-known in the art, and can be prepared from monomers such as methyl acrylate, acrylic acid, methacrylic acid, methyl methacrylate, butyl methacrylate, cyclohexyl methacrylate, and the like. The active hydrogen functional group, e.g., hydroxyl, can be incorporated into the ester portion of the acrylic monomer. For example, hydroxy-functional acrylic monomers that can be used to form such polymers include hydroxyethyl acrylate, hydroxybutyl acrylate, hydroxybutyl methacrylate, hydroxypropyl acrylate, and the like. Amino-functional acrylic monomers would include t-butylaminoethyl methacrylate and t-butylamino-ethylacrylate. Other acrylic monomers having active hydrogen functional groups in the ester portion of the monomer are also within the skill of the art.

Modified acrylics can also be used as the polymer (a) according to the invention. Such acrylics may be polyester-modified acrylics or polyurethane-modified acrylics, as is well-known in the art. Polyester-modified acrylics modified with ε-caprolactone are described in U.S. Pat. No. 4,546,046 of Etzell et al, the disclosure of which is incorporated herein by reference. Polyurethane-modified acrylics are also well-known in the art. They are described, for example, in U.S. Pat. No. 4,584,354, the disclosure of which is incorporated herein by reference.

Polyesters having active hydrogen groups such as hydroxyl groups can also be used as the polymer in the composition according to the invention. Such polyesters are well-known in the art, and may be prepared by the polyesterification of organic polycarboxylic acids (e.g., phthalic acid, hexahydrophthalic acid, adipic acid, maleic acid) or their anhydrides with organic polyols containing primary or secondary hydroxyl groups (e.g., ethylene glycol, butylene glycol, neopentyl glycol).

Polyurethanes having active hydrogen functional groups are also well-known in the art. They are prepared by a chain extension reaction of a polyisocyanate (e.g., hexamethylene diisocyanate, isophorone diisocyanate, MDI, etc.) and a polyol (e.g., 1,6-hexanediol, 1,4-butanediol, neopentyl glycol, trimethylol propane). They can be provided with active hydrogen functional groups by capping the polyurethane chain with an excess of diol, polyamine, amino alcohol, or the like.

In one embodiment, the polymer resin (a) is carbamate-functional. A carbamate-functional resin (a) can be prepared in a variety of ways. One way to prepare such polymers is to prepare an acrylic monomer having a carbamate functionality in the ester portion of the monomer. Such monomers are well-known in the art and are described, for example in U.S. Pat. Nos. 3,479,328, 3,674,838, 4,126,747, 4,279,833, and 4,340,497, 5,356,669, and WO 94/10211, the disclosures of which are incorporated herein by reference. One method of synthesis involves reaction of a hydroxy ester with cyanic acid (which may be formed by the thermal decomposition of urea) to form the carbamyloxy carboxylate (i.e., carbamate-modified acrylic). Another method of synthesis reacts an α,β-unsaturated acid ester with a hydroxy carbamate ester to form the carbamyloxy carboxylate. Yet another technique involves formation of a hydroxyalkyl carbamate by reacting a primary or secondary amine or diamine with a cyclic carbonate such as ethylene carbonate. The hydroxyl group on the hydroxyalkyl carbamate is then esterified by reaction with acrylic or methacrylic acid to form the monomer. Other methods of preparing carbamate-modified acrylic monomers are described in the art, and can be utilized as well. The acrylic monomer can then be polymerized along with other ethylenically-unsaturated monomers, if desired, by techniques well-known in the art.

An alternative route for preparing a carbamate-functional polymer (a) used in the composition of the invention is to react an already-formed polymer such as an acrylic polymer with another component to form a carbamate-functional group appended to the polymer backbone, as described in U.S. Pat. No. 4,758,632, the disclosure of which is incorporated herein by reference. One technique for preparing polymers useful as component (a) involves thermally decomposing urea (to give off ammonio and HNCO) in the presence of a hydroxy-functional acrylic polymer to form a carbamate-functional acrylic polymer. Another technique involves reacting the hydroxyl group of a hydroxyalkyl carbamate with the isocyanate group of an isocyanate-functional acrylic or vinyl monomer to form the carbamate-functional acrylic. Isocyanate-functional acrylics are known in the art and are described, for example in U.S. Pat. No. 4,301,257, the disclosure of which is incorporated herein by reference. Isocyanate vinyl monomers are well-known in the art and include unsaturated m-tetramethyl xylene isocyanate. Yet another technique is to react the cyclic carbonate group on a cyclic carbonate-functional acrylic with ammonia in order to form the carbamate-functional acrylic. Cyclic carbonate-functional acrylic polymers are known in the art and are described, for example, in U.S. Pat. No. 2,979,514, the disclosure of which is incorporated herein by reference. Another technique is to transcarbamylate a hydroxy-functional acrylic polymer with an alkyl carbamate. A more difficult, but feasible way of preparing the polymer would be to transesterify an acrylate polymer with a hydroxyalkyl carbamate.

A carbamate-functional polymer component (a) can be represented by the randomly repeating units according to the following formula:

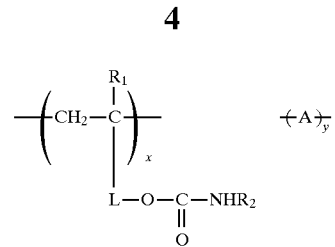

In the above formula, $R_1$ represents H or $CH_3$. R2 represents H, alkyl, preferably of 1 to 6 carbon atoms, or cycloalkyl, preferably up to 6 ring carbon atoms. It is to be understood that the terms alkyl and cycloalkyl are to include substituted alkyl and cycloalkyl, such as halogen-substituted alkyl or cycloalkyl. Substituents that will have an adverse impact on the properties of the cured material, however, are to be avoided. For example, ether linkages are thought to be susceptible to hydrolysis, and should be avoided in locations that would place the ether linkage in the crosslink matrix. The values x and y represent weight percentages, with x being 10 to 90% and preferably 40to 60%, and y being 90 to 10% and preferably 60 to 40%.

In the formula, A represents repeat units derived from one or more ethylenically unsaturated monomers. Such monomers for copolymerization with acrylic monomers are known in the art. They include alkyl esters of acrylic or methacrylic acid, e.g., ethyl acrylate, butyl acrylate, 2-ethylhexyl acrylate, butyl methacrylate, isodecyl methacrylate, hydroxyethyl methacrylate, hydroxypropyl acrylate, and the like; and vinyl monomers such as unsaturated m-tetramethyl xylene isocyanate, styrene, vinyl toluene and the like.

L represents a divalent linking group, preferably an aliphatic of 1 to 8 carbon atoms, cycloaliphatic, or aromatic linking group of 6 to 10 carbon atoms. Examples of L include

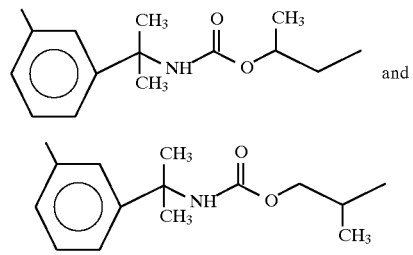

—(CH$_2$)—, —(CH$_2$)$_2$—, —(CH$_2$)$_4$—, and the like. In one preferred embodiment, —L— is represented by —COO—L'- where L' is a divalent linking group. Thus, in a preferred embodiment of the invention, the polymer component (a) is represented by randomly repeating units according to the following formula:

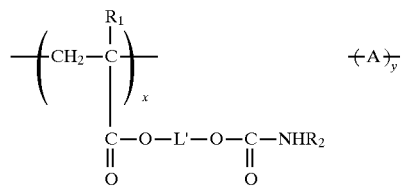

In this formula, $R_1$, $R_2$, A, x, and y are as defined above. L' may be a divalent aliphatic linking group, preferably of 1 to 8 carbon atoms, e.g., —(CH$_2$)—, —(CH$_2$)$_2$—, —(CH$_2$)$_4$—, and the like, or a divalent cycloaliphatic linking group, preferably up to 8 carbon atoms, e.g., cyclohexyl, and the like. However, other divalent linking groups can be used, depending on the technique used to prepare the polymer. For example, if a hydroxyalkyl carbamate is adducted onto an isocyanate-functional acrylic polymer, the linking group L' would include an —NHCOO— urethane linkage as a residue of the isocyanate group.

The composition of the invention is cured by a reaction of the active hydrogen-functional compound (a) with a component (b) having a plurality of functional groups that are reactive with the active hydrogen groups on component (a). Such reactive groups include active methylol or methylalkoxy groups on aminoplast crosslinking agents or on other compounds such as phenol/formaldehyde adducts, isocyanate groups, siloxane groups, cyclic carbonate groups, and anhydride groups. Examples of (b) compounds include melamine formaldehyde resin (including monomeric or polymeric melamine resin and partially or fully alkylated melamine resin), blocked or unblocked polyisocyanates (e.g., TDI, MDI, isophorone diisocyanate, hexamethylene diisocyanate, and isocyanurate trimers of these, which may be blocked for example with alcohols or oximes), urea resins (e.g., methylol ureas such as urea formaldehyde resin, alkoxy ureas such as butylated urea formaldehyde resin), polyanhydrides (e.g., polysuccinic anhydride), and polysiloxanes (e.g., trimethoxy siloxane). Aminoplast resin such as melamine formaldehyde resin or urea formaldehyde resin are especially preferred.

According to the invention, compound (c) comprises at least one carbamate group derived from a hydroxyl group that is the result of a ring-opening reaction between an epoxy group and an organic acid group. This reaction often utilizes carboxylic acid groups, although other organic acids such as phenolic compounds may be used as well. The acid/epoxy reaction is well-known in the chemical arts, and may proceed spontaneously at ambient conditions, either in solvent or neat, and may be advantageously accelerated with heat.

The hydroxy group-containing precursor of compound (c) can be prepared in a variety of ways, such as by reacting of a monoepoxide with a monoacid, reacting a monoepoxide with a hydroxy acid, reacting a monoepoxide with a polyacid, reacting a polyepoxide with a monoacid, reacting a polyepoxide with a hydroxy acid, or reacting a polyepoxide with a polyacid.

Virtually any epoxide may be used in the practice of the present invention. Epoxides are well-known in the art, and may be characterized by the general formula:

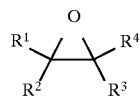

where $R^1$, $R^2$, $R^3$, and $R^4$ are each independently H (with the proviso that at least one of $R^1$–$R^4$ is other than H), an organic radical, which may be polymeric or non-polymeric and may contain unsaturation and/or heteroatoms, or one of $R^1$ or $R^2$ together with one of $R^3$ or $R^4$ may form a cyclic ring, which may contain unsaturation and/or heteroatoms.

Useful epoxides can be prepared from alcohols, e.g., butanol, trimethylol propane, by reaction with an epihalohydrin (e.g., epichlorohydrin), or by reaction of an allyl group with peroxide. The epoxide may be monofunctional or polyfunctional, which can be controlled by selection of the starting material. For example, a monoepoxide can be prepared by reacting a mono-alcohol with an epihalohydrin or a monounsaturate with peroxide, and a polyepoxide can be prepared by reacting a polyol (including diols, triols, and higher-functionality polyols) with an epihalohydrin or a polyunsaturate compound with peroxide. Oligomeric or polymeric polyepoxides, such as acrylic polymers or oligomers containing glycidyl methacrylate or epoxy-terminated polyglycidyl ethers such as the diglycidyl ether of bisphenol A (DGEBPA), can also be used. Epoxidized polyurethane resins or polyester resins can be prepared by reacting OH group-containing polyurethanes or polyesters, as are known in the art, with an epihalohydrin. Epoxides can also be prepared by reacting an isocyanate-terminated component such as a monomeric polyisocyanate (including isocyanurates, e.g., the isocyanurate of isophorone diisocyanate) or polymer or oligomer with glycidol. Other known polyepoxides, e.g., epoxy-novolacs, may also be used.

In one preferred embodiment, the epoxide is a monoepoxide, preferably an epoxy ester, also known as a glycidyl ester. Glycidyl esters can be prepared by reacting a monofunctional carboxylic acid (e.g., octanoic acid, benzoic acid, benzylic acid, cyclohexane carboxylic acid) with an epihalohydrin (e.g., epichlorohydrin) under conditions well-known in the art. Glycidyl esters are commercially available, e.g., as Cardura® E from Shell Oil Company, Glydexx® N-10 from Exxon, or Araldite® PT910 from Ciba-Geigy. Glycidyl esters may be described by the formula:

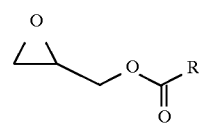

wherein R is a hydrocarbon group of from 1 to 40 carbon atoms, preferably 1–20 carbon atoms, and most preferably 1–12 carbon atoms. This hydrocarbon group may be substituted, as is known in the art. Polyglycidyl esters may also be used, and can be prepared by reacting a polyfunctional carboxylic acid (e.g., phthalic acid, thioglycolic acid, adipic acid) with an epihalohydrin. Polyglycidyl esters can also be described by the above formula where R is substituted with other glycidyl ester groups.

Another useful class of monoepoxides are glycidyl ethers. Glycidyl ethers can be prepared by the reaction of monofunctional alcohols (e.g., n-butanol, propanol, 2-ethyl hexanol, dodecanol, phenol, cresol, cyclohexanol, benzyl alcohol) with an epihalohydrin (e.g., epichlorohydrin). Useful glycidyl ethers include the glycidyl ether of 2-ethanol hexanol, the glycidyl ether of dodecanol, the glycidyl ether of phenol, and the like. These compounds are commercially available under the Erisys® product family from CVC Specialties. Polyglycidyl ethers may also be used, and can be prepared by reacting a polyfunctional alcohol (e.g., bisphenol A, 1,6-hexane diol) with an epihalohydrin.

Epoxides may also be prepared by reacting a compound containing one or more double bonds with peroxide or peracetic acid under conditions well-known in the art. Virtually any double bond-containing compound may be used. One useful class of double bond-containing compounds are cycloaliphatic monounsaturated compounds such as

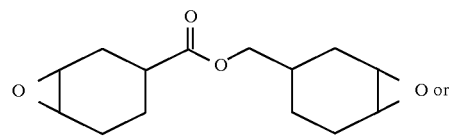

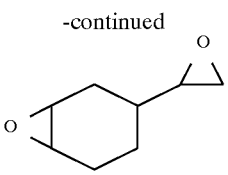

which may be sold as the Cyracure® products from Union Carbide. Other double bond-containing compounds that may be used in the practice of the invention include ethylene, propylene, styrene, styrene oxide, cyclohexene, polybutadiene, and the like.

The epoxide may also be an acrylic-containing polymer or oligomer, preferably deriving its epoxy groups from glycidyl methacrylate monomer, glycidyl acrylate, allyl glycidyl ether, cyclohexyl monoepoxyy methacrylate, the epoxide of the dimer of cylopentadiene methacrylate, or epoxidized butadiene, more preferably glycidyl methacrylate.

The above-described epoxides are reacted with a compound containing an organic acid group to open the oxirane ring on the epoxide. Useful acids include, for example, monoacids, polyacids, hydroxy acids, and the like. Useful mono-acids such as benzoic acid, pivalic acid, Versatic® acid, octanoic acid, butyric acid, dodecanoic acid, or benzophenol. Useful hydroxy acids include dimethylol propionic acid, hydroxy pivalic acid, malic acid, tartaric acid, and citric acid. When hydroxy acids are used, the reaction is preferably conducted without catalyst so that unwanted reaction of the hydroxyl groups with the epoxy groups is minimized. Useful polyacids include tricarballylic acid, adipic acid, azeleic acid, trimellitic anhydride, citric acid, malic acid, tartaric acid, citric acid, bisphenol F, and bisphenol A. A polyepoxide may also be reacted with a hydroxy acid or a polyacid, although in the case of the polyacid/polyepoxide reaction, the starting materials and reaction conditions should be controlled so as to avoid any unwanted chain extension or branching, which could result in high molecular weight compounds that could increase VOC or cause gelation.

The compound containing the hydroxy group derived from the acid/epoxy ring-opening reaction is reacted with cyanic acid or a compound comprising a carbamate group. Cyanic acid may be formed by the well-known reaction of the thermal decomposition of urea or by other methods, such as described in U.S. Pat. Nos. 4,389,386 or 4,364,913. When a compound comprising a carbamate group is utilized, the reaction with the hydroxyl group is believed to be a transesterification between the OH group and the carbamate. The carbamate compound can be any compound having a carbamate group capable of undergoing a transesterification with a hydroxyl group. These include, for example, methyl carbamate, butyl carbamate, propyl carbamate, 2-ethylhexyl carbamate, cyclohexyl carbamate, phenyl carbamate, hydroxypropyl carbamate, hydroxyethyl carbamate, and the like. Useful carbamate compounds can be characterized by the formula:

R'—O—(C=O)—NHR"

wherein R' is substituted or unsubstituted alkyl (preferably of 1–8 carbon atoms) and R" is H, substituted or unsubstituted alkyl (preferably of 1–8 carbon atoms, substituted or unsubstituted cycloalkyl (preferably of 6–10 carbon atoms), or substituted or unsubstituted aryl (preferably of 6–10 carbon atoms). Preferably, R" is H.

The transesterification reaction between the carbamate and hydroxyl group-containing compounds can be conducted under typical transesterification conditions, e.g., temperatures from room temperature to 150° C. with transesterification catalysts such as calcium octoate, metal hydroxides (e.g., KOH), Group I or II metals (e.g., Na, Li), metal carbonates (e.g., $K_2CO_3$) which may be enhanced by use in combination with crown ethers, metal oxides (e.g., dibutyltin oxide), metal alkoxides (e.g., $NaOCH_3$, $Al(OC_3H_7)_3$), metal esters (e.g., stannous octoate, calcium octoate, or protic acids (e.g., $H_2SO_4$), $MgCO_3$, or $Ph_4SbI$. The reaction may also be conducted at room temperature with a polymer-supported catalyst such as Amberlyst-15® (Rohm & Haas) as described by R. Anand, *Synthetic Communications*, 24(19), 2743–47 (1994), the disclosure of which is incorporated herein by reference.

The ring-opening of the oxirane ring of an epoxide compound by a carboxylic acid results in a hydroxy ester structure. Subsequent transesterification of the hydroxyl group on this structure by the carbamate compound results in a carbamate-functional component that can be represented by either of the structures:

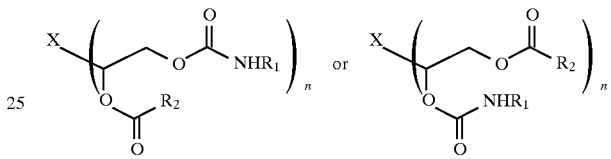

or a combination thereof, wherein n is a positive integer of at least 1, $R_1$ represents H, alkyl, or cycloalkyl, and $R_2$ represents alkyl, aryl, or cycloalkyl, and X represents an organic radical that is a residue of the epoxide compound. As used herein, it should be understood that these alkyl, aryl, or cycloalkyl groups may be substituted. For example, where a monoepoxide is reacted with a polyacid, $R_2$ in the above structures would represent the residue of the polyacid, and would be substituted with other carbamate group(s) resulting from the other acid groups on the polyacid reacting with the monoepoxide followed by transesterification with the carbamate compound.

According to the present invention, component (a), component (b), or both components (a) and (b) should have at least one group thereon that is reactive with the carbamate group(s) on component (c). This is preferably accomplished through the selection of an aminoplast as component (b). Depending on the cure conditions, other compounds identified above as component (b) may also be reactive with the carbamate group(s) on component (c). Component (a) may also contain groups that are reactive with carbamate, such as an acrylic polymer containing isobutoxymethyl acrylamide groups.

A solvent may optionally be utilized in the coating composition used in the practice of the present invention. Although the composition used according to the present invention may be utilized, for example, in the form of substantially solid powder, or a dispersion, it is often desirable that the composition is in a substantially liquid state, which can be accomplished with the use of a solvent. This solvent should act as a solvent with respect to both the carbamate-functional compound (a) as well as the component (b). In general, depending on the solubility characteristics of components (a) and (b), the solvent can be any organic solvent and/or water. In one preferred embodiment, the solvent is a polar organic solvent. More preferably, the solvent is a polar aliphatic solvents or polar aromatic solvents. Still more preferably, the solvent is a ketone, ester, acetate, aprotic amide, aprotic sulfoxide, or aprotic amine.

Examples of useful solvents include methyl ethyl ketone, methyl isobutyl ketone, m-amyl acetate, ethylene glycol butyl ether-acetate, propylene glycol monomethyl ether acetate, xylene, N-methylpyrrolidone, or blends of aromatic hydrocarbons. In another preferred embodiment, the solvent is water or a mixture of water with small amounts of co-solvents.

The coating composition used in the practice of the invention may include a catalyst to enhance the cure reaction. For example, when aminoplast compounds, especially monomeric melamines, are used as component (b), a strong acid catalyst may be utilized to enhance the cure reaction. Such catalysts are well-known in the art and include, for example, p-toluenesulfonic acid, dinonylnaphthalene disulfonic acid, dodecylbenzenesulfonic acid, phenyl acid phosphate, monobutyl maleate, butyl phosphate, and hydroxy phosphate ester. Strong acid catalysts are often blocked, e.g. with an amine. Other catalysts that may be useful in the composition of the invention include Lewis acids, zinc salts, and tin salts.

In a preferred embodiment of the invention, the solvent is present in the coating composition in an amount of from about 0.01 weight percent to about 99 weight percent, preferably from about 10 weight percent to about 60 weight percent, and more preferably from about 30 weight percent to about 50 weight percent.

Coating compositions can be coated on the article by any of a number of techniques well-known in the art. These include, for example, spray coating, dip coating, roll coating, curtain coating, and the like. For automotive body panels, spray coating is preferred.

Any additional agent used, for example, surfactants, fillers, stabilizers, wetting agents, dispersing agents, adhesion promoters, UV absorbers, HALS, etc. may be incorporated into the coating composition. While the agents are well-known in the prior art, the amount used must be controlled to avoid adversely affecting the coating characteristics.

The coating composition according to the invention is preferably utilized in a high-gloss coating and/or as the clearcoat of a composite color-plus-clear coating. High-gloss coatings as used herein are coatings having a 20° gloss (ASTM D523-89) or a DOI (ASTM E430-91) of at least 80.

When the coating composition of the invention is used as a high-gloss pigmented paint coating, the pigment may be any organic or inorganic compounds or colored materials, fillers, metallic or other inorganic flake materials such as mica or aluminum flake, and other materials of kind that the art normally names as pigments. Pigments are usually used in the composition in an amount of 1% to 100%, based on the total solid weight of components A and B (i.e., a P:B ratio of 0.1 to 1).

When the coating composition according to the invention is used as the clearcoat of a composite color-plus-clear coating, the pigmented basecoat composition may any of a number of types well-known in the art, and does not require explanation in detail herein. Polymers known in the art to be useful in basecoat compositions include acrylics, vinyls, polyurethanes, polycarbonates, polyesters, alkyds, and polysiloxanes. Preferred polymers include acrylics and polyurethanes. In one preferred embodiment of the invention, the basecoat composition also utilizes a carbamate-functional acrylic polymer. Basecoat polymers may be thermoplastic, but are are preferably crosslinkable and comprise one or more type of cross-linkable functional groups. Such groups include, for example, hydroxy, isocyanate, amine, epoxy, acrylate, vinyl, silane, and acetoacetate groups. These groups may be masked or blocked in such a way so that they are unblocked and available for the cross-linking reaction under the desired curing conditions, generally elevated temperatures. Useful cross-linkable functional groups include hydroxy, epoxy, acid, anhydride, silane, and acetoacetate groups. Preferred cross-linkable functional groups include hydroxy functional groups and amino functional groups.

Basecoat polymers may be self-cross-linkable, or may require a separate cross-linking agent that is reactive with the functional groups of the polymer. When the polymer comprises hydroxy functional groups, for example, the cross-linking agent may be an aminoplast resin, isocyanate and blocked isocyanates (including isocyanurates), and acid or anhydride functional cross-linking agents.

The coating compositions described herein are preferably subjected to conditions so as to cure the coating layers. Although various methods of curing may be used, heat-curing is preferred. Generally, heat curing is effected by exposing the coated article to elevated temperatures provided primarily by radiative heat sources. Curing temperatures will vary depending on the particular blocking groups used in the cross-linking agents, however they generally range between 93° C. and 177° C. The compounds (c) according to the present invention are reactive even at relatively low cure temperatures. Thus, in a preferred embodiment, the cure temperature is preferably between 115° C. and 150° C., and more preferably at temperatures between 115° C. and 138° C. for a blocked acid catalyzed system. For an unblocked acid catalyzed system, the cure temperature is preferably between 82° C. and 99° C. The curing time will vary depending on the particular components used, and physical parameters such as the thickness of the layers, however, typical curing times range from 15 to 60 minutes, and preferably 15–25 minutes for blocked acid catalyzed systems and 10–20 minutes for unblocked acid catalyzed systems.

The invention has been described in detail with reference to preferred embodiments thereof. It should be understood, however, that variations and modifications can be made within the spirit and scope of the invention.

EXAMPLE 1

Partially Carbamated Hydroxy Acid Carbamate Crosslinked with Melamine and Blocked Isocyanate.

A clearcoat mixture was prepared using the following ingredients.

| Material | Weight (grams) * |
| --- | --- |
| 61% Carbamated N-10 Modified Dimethyl propionic oligomer | 74.1 |
| Hexamethoxymethyl Melamine | 22.5 |
| Blocked Desmodur Z-4370 | 19.2 |
| Tinuvin 384 | 3.2 |
| Tinuvin 292 | 1.5 |
| Dodecylbenzene sulfonic acid | 4.0 |
| Methyl Amyl Ketone | 29.3 |

EXAMPLE 2

Blend of Hydroxy Acid Carbamate and Carbamate Functional Acrylic Crosslinked with Melamine.

A clearcoat was prepared using the following ingredients.

| Material | Weight (grams) |
| --- | --- |
| N-10 modified Dimethyl propionic acid Carbamate Oligomer | 50.8 |
| Carbamate Functional Acrylic Resin from BASF | 52.1 |
| Hexamethoxymethyl Melamine | 21.1 |
| Tinuvin 384 | 3.2 |
| Tinuvin 292 | 1.5 |
| Dodecylbenzene Sulfonic Acid | 4.0 |
| Methyl Amyl Ketone | 34.5 |

EXAMPLE 3

Blend of Hydroxy Acid Carbamate and Hydroxyl Functional Acrylic Resin Crosslinked with Melamine.

A clearcoat mixture was prepared using the following ingredients.

| Material | Weight (grams) |
| --- | --- |
| N-10 Modified Citric Acid Carbamate Oligomer | 72.7 |
| Acrylic Resin | 29.6 |
| Hexamethoxymethyl Melamine | 18.0 |
| Tinuvin 384 | 3.2 |
| Tinuvin 292 | 1.5 |
| Dodecyl benzene sulfonic acid | 4.0 |
| Methyl Amyl Ketone | 32.3 |

What is claimed is:

1. A curable coating composition comprising
    (a) a polymer resin comprising active hydrogen-containing functional groups,
    (b) a curing agent having groups that are reactive with said functional groups on (a), and
    (c) a compound comprising at least one carbamate group that is the reaction product of:
        1) a hydroxyl group that is the result of a ring-opening reaction between an epoxy group and an organic acid group, and
        (2) cyanic acid or a carbamate group.

2. A curable coating composition according to claim 1 wherein polymer resin (a) comprises carbamate active hydrogen functional groups.

3. A curable coating composition according to claim 1 wherein polymer resin (a) comprises hydroxyl active hydrogen functional groups.

4. A curable coating composition according to claim 1 wherein the curing agent (b) is an aminoplast.

5. A curable coating composition according to claim 1 wherein the aminoplast is a melamine formaldehyde resin.

6. A curable coating composition according to claim 1 wherein the compound (c) is present at 3–50 weight percent of total resin solids in the coating composition.

7. A curable coating composition according to claim 1 wherein the polymer resin (a) is an acrylate or methacrylate polymer.

8. A curable coating composition according to claim 1 wherein the compound (c) comprises a single carbamate group.

9. A curable coating composition according to claim 1 wherein the compound (c) comprises at least 2 carbamate groups.

10. A curable coating composition according to claim 1 wherein components (a), (b), and (c) are dispersed in an organic solvent medium.

11. A curable coating composition according to claim 1 wherein components (a), (b), and (c) are dispersed in an aqueous medium.

12. A curable coating composition according to claim 1 wherein components (a), (b), and (c) are in the form of a powder.

13. A curable coating composition according to claim 1 wherein compound (c) is represented by either of the structures:

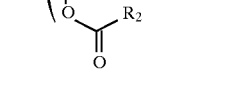

or a combination thereof, wherein n is a positive integer of at least 1, $R_1$ represents H, alkyl, or cycloalkyl, $R_2$ represents alkyl, aryl, or cycloalkyl, and X represents an organic radical.

14. A curable coating composition according to claim 13 wherein n is 1.

15. A curable coating composition according to claim 13 wherein n is a positive integer of from 2 to 6.

16. A curable coating composition according to claim 1 having a VOC of less than 3.8 lbs/ft3.

17. A curable coating composition according to claim 6 having a VOC of less than 3.0 lbs/ft3.

18. A curable coating composition according to claim 7 having a VOC of less than 2.0 lbs/ft3.

19. A curable coating composition according to claim 8 having a VOC of less than 1.0 lbs/ft3.

20. A curable coating composition according to claim 1 wherein said organic acid group is a carboxyl group.

21. A cured coating comprising the reaction product of a coating composition according to claim 1.

22. A coating according to claim 21 having a 20° gloss, as defined by ASTM D523–89, of at least 80.

23. A coating according to claim 21 having a DOI, as defined by ASTM E430–91, of at least 80.

24. A composite color-plus-clear coating wherein the clear coating is derived from a coating composition according to claim 1.

* * * * *

UNITED STATES PATENT AND TRADEMARK OFFICE
CERTIFICATE OF CORRECTION

PATENT NO.   : 5,872,195
DATED        : February 16, 1999
INVENTOR(S)  : Marvin L. Green et al.

It is certified that error appears in the above-identified patent and that said Letter Patent is hereby corrected as shown below:

On the title page: Item

[60] Provisional Application No. 60/021,068 July 1, 1996.

Signed and Sealed this

Seventh Day of December, 1999

Attest:

Q. TODD DICKINSON

*Attesting Officer*     *Acting Commissioner of Patents and Trademarks*